(12) United States Patent
Wan et al.

(10) Patent No.: US 11,397,575 B2
(45) Date of Patent: Jul. 26, 2022

(54) MICROSERVICES GRAPH GENERATION

(71) Applicant: SAP SE, Walldorf (DE)

(72) Inventors: Deng Feng Wan, Shanghai (CN); Zuxing Wang, Shanghai (CN)

(73) Assignee: SAP SE, Walldorf (DE)

(*) Notice: Subject to any disclaimer, the term of this patent is extended or adjusted under 35 U.S.C. 154(b) by 35 days.

(21) Appl. No.: 17/122,971

(22) Filed: Dec. 15, 2020

(65) Prior Publication Data

US 2022/0188104 A1 Jun. 16, 2022

(51) Int. Cl.
*G06F 8/75* (2018.01)
*G06F 16/2452* (2019.01)
*G06F 9/22* (2006.01)

(52) U.S. Cl.
CPC ............ *G06F 8/75* (2013.01); *G06F 9/22* (2013.01); *G06F 16/24526* (2019.01)

(58) Field of Classification Search
CPC ......... G06F 8/75; G06F 16/24526; G06F 9/22
See application file for complete search history.

(56) References Cited

U.S. PATENT DOCUMENTS

2021/0124577 A1* 4/2021 Gupta ................. G06F 9/45533
2022/0060431 A1* 2/2022 Vadayadiyil Raveendran ............ H04L 41/147

OTHER PUBLICATIONS

Shang-Pin Ma, "Using Service Dependency Graph to Analyze and Test Microservices", Jun. 22, 2018, IEEE (Year: 2018).*
Tuomas Nurmela, "Qualitative Evaluation of Dependency Graph Representativeness", 2019, Aalto University, Otakaari 24, Espoo, Finland (Year: 2019).*

* cited by examiner

*Primary Examiner* — Wei Y Zhen
*Assistant Examiner* — Amir Soltanzadeh
(74) *Attorney, Agent, or Firm* — Fountainhead Law Group P.C.

(57) ABSTRACT

The present disclosure provides systems and methods for generating a graph of microservices of a software application. Source code for the application may be parsed using one or more method identifiers to identify a plurality of methods of the software application. Names and path values for the plurality of methods may be stored in a graph database as nodes and edges. The graph database may be queried to determine dependencies of a method, including the microservice that the method belongs to any remote methods called by the method. In addition, properties of the nodes may be transformed into a set of vectors to provide searching of the graph and recommendations.

20 Claims, 10 Drawing Sheets

MICROSERVICES GRAPH GENERATION

BACKGROUND

The present disclosure pertains to microservices and in particular to graph databases.

Traditionally, many software applications were designed as a single "monolithic" application (i.e., a single logical executable). With a monolithic software design, changes to the software system may involve building and deploying a new version of the entire application, Recently, some software applications (e.g., cloud applications) have adopted the microservice architectural style. In the microservices architecture, a single application is developed as a suite of different services (i.e., microservices), instead of as a single logical executable. Each of these microservices may be an independent process. Accordingly, the different microservices may be written in different programming languages, use different technologies, and use different storage spaces. The microservices may be designed as out-of-process components that may communicate with each other using remote procedure calls. For example, the microservices may provide application programming interfaces (APIs) that can be accessed by other microservices.

Implementing the microservice architecture in designing a software application may enable smaller teams of specialized software developers to focus on a specific set of related services, thereby improving software quality. In addition, software updates may be more easily tested since each microservices may be more independent compared to a monolithic application, even where the microservice is dependent on other microservices. Furthermore, updates to a particular microservice may be deployed without building and deploying the entire application.

While the microservice architecture provides these advantages, there may be a lot of service-to-service communication, which may make the dependency among microservices very complex for software developers to determine. And in applications with a large number of microservices, it may not be easy for software developers to be able to search through the microservices and retrieve information about them. Accordingly, it may be difficult to determine which other microservices need to be changed or tested when changes to a particular microservice are made.

There is a need for improved systems and methods for determining dependencies among microservices. The present disclosure addresses these issues and others, as further described below.

SUMMARY

One embodiment provides a computer system comprising one or more processors and one or more machine-readable medium. The one or more machine-readable medium is coupled to the one or more processors. The one or more machine-readable medium store computer program code comprising sets of instructions executable by the one or more processors. The instructions are executable by the one or more processors to parse source code of a software application comprising a plurality of microservices to identify a plurality of methods based on one or more method identifiers. The plurality of methods may comprise a plurality of remote calling methods. The instructions are further executable to determine a name and a path value for each method of the plurality of methods. The name identifies the method and the path value identifies a microservice that the method belongs to. The instructions are further executable to determine a remote name and a remote path value for each remote calling method of the plurality of remote calling methods. The remote name identifies a remote method of the plurality of methods called by the remote calling method. The remote path value identifies an endpoint for calling the remote method. The instructions are further executable to store the name for each method of the plurality of methods in a graph database representing a graph. Each method of the plurality of methods being represented as a node in the graph. The instructions are further executable to store the path value for each method of the plurality of methods in the graph database. Each path value is represented as an edge between a node representing the method and a node representing the microservice that the method belongs to. The instructions are further executable to store the remote path value for each remote calling method of the plurality of remote calling methods in the graph database. Each remote path value is represented as an edge between a node representing the remote calling method and a node representing the remote method of the plurality of methods called by the remote calling method. The instructions are further executable to query the graph database using an identifier of a first method of the plurality of methods to determine one or more dependent methods related to the first method.

Another embodiment provides one or more non-transitory computer-readable medium storing computer program code comprising sets of instructions. The computer program code comprising instructions to parse source code of a software application comprising a plurality of microservices to identify a plurality of methods based on one or more method identifiers. The plurality of methods comprising a plurality of remote calling methods. The computer program code further comprising instructions to determine a name and a path value for each method of the plurality of methods. The name identifying the method. The path value identifying a microservice that the method belongs to. The computer program code further comprising instructions to determine a remote name and a remote path value for each remote calling method of the plurality of remote calling methods. The remote name identifies a remote method of the plurality of methods called by the remote calling method. The remote path value identifies an endpoint for calling the remote method. The computer program code further comprising instructions to store the name for each method of the plurality of methods in a graph database representing a graph. Each method of the plurality of methods being represented as a node in the graph. The computer program code further comprising instructions to store the path value for each method of the plurality of methods in the graph database. Each path value being represented as an edge between a node representing the method and a node representing the microservice that the method belongs to. The computer program code further comprising instructions to store the remote path value for each remote calling method of the plurality of remote calling methods in the graph database. Each remote path value represented as an edge between a node representing the remote calling method and a node representing the remote method of the plurality of methods called by the remote calling method. The computer program code further comprising instructions to query the graph database using an identifier of a first method of the plurality of methods to determine one or more dependent methods related to the first method.

Another embodiment provides a computer-implemented method. The computer-implemented method includes parsing source code of a software application comprising a plurality of microservices to identify a plurality of methods based on one or more method identifiers. The plurality of methods comprising a plurality of remote calling methods. The computer-implemented method further including determining a name and a path value for each method of the plurality of methods, the name identifying the method. The path value identifying a microservice that the method belongs to. The computer-implemented method further including determining a remote name and a remote path value for each remote calling method of the plurality of remote calling methods. The remote name identifying a remote method of the plurality of methods called by the remote calling method. The remote path value identifying an endpoint for calling the remote method. The computer-implemented method further including storing the name for each method of the plurality of methods in a graph database representing a graph. Each method of the plurality of methods represented as a node in the graph. The computer-implemented method further including storing the path value for each method of the plurality of methods in the graph database. Each path value represented as an edge between a node representing the method and a node representing the microservice that the method belongs to. The computer-implemented method further including storing the remote path value for each remote calling method of the plurality of remote calling methods in the graph database. Each remote path value represented as an edge between a node representing the remote calling method and a node representing the remote method of the plurality of methods called by the remote calling method. The computer-implemented method further including querying the graph database using an identifier of a first method of the plurality of methods to determine one or more dependent methods related to the first method.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

Figure 1:
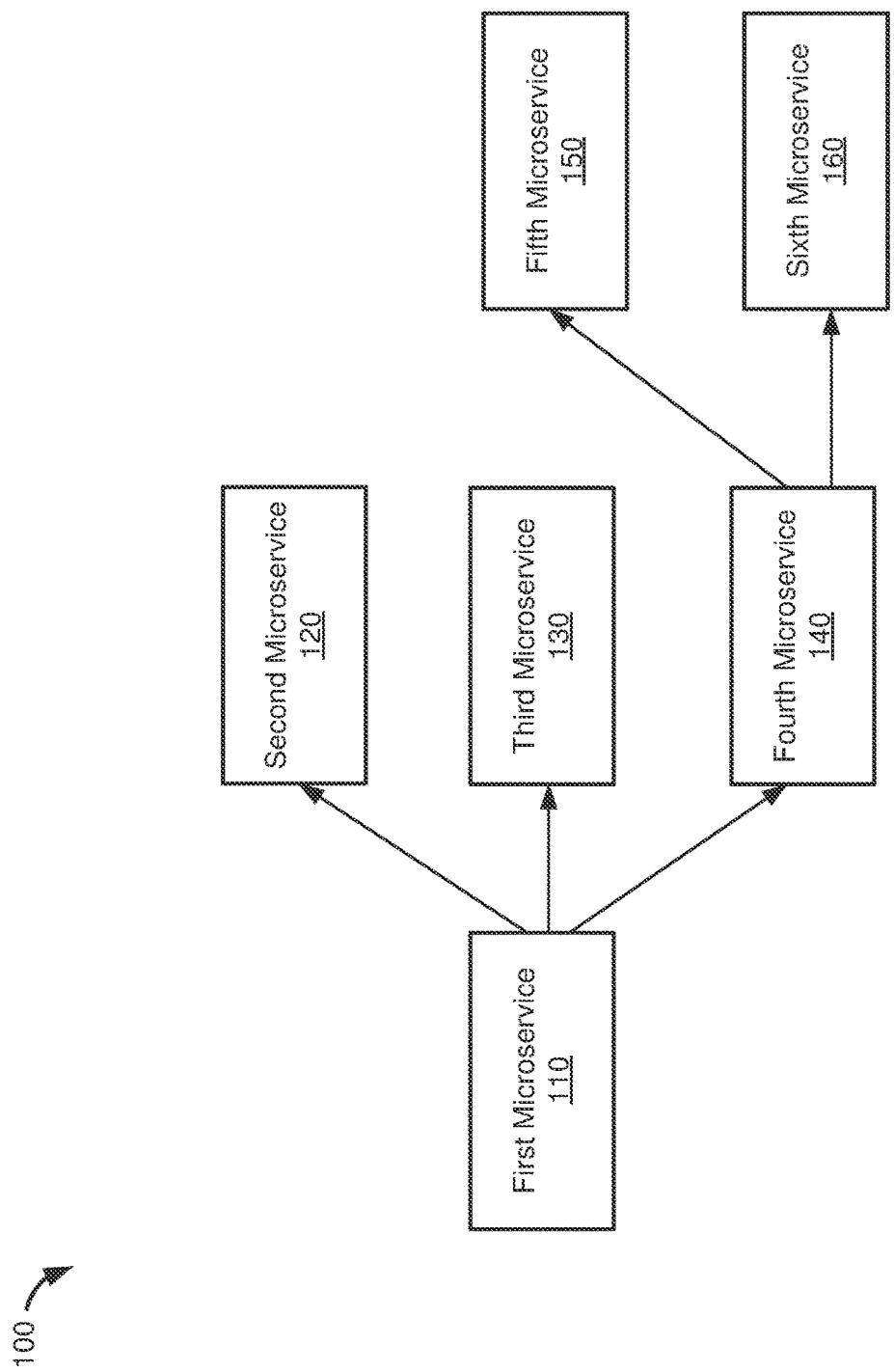
FIG. 1 shows a diagram of a microservice architecture, according to an embodiment.

As mentioned above, in the microservices architecture, a single application is developed as a suite of different services (i.e., microservices), instead of as a single logical executable. FIG. 1 shows a diagram 100 of a microservice architecture, according to an embodiment. In this example, the application includes a first microservice 110, a second microservice 120, a third microservice 130, a fourth microservice 140, a fifth microservice 150, and a sixth microservice 160. Each of these microservices may be an independent process. Accordingly, the different microservices may be written in different programming languages, use different technologies, and use different storage spaces. The microservices may be designed as out-of-process components that may communicate with each other using remote procedure calls. For example, the microservices may provide application programming interfaces (APIs) that can be accessed by other microservices. For example, the first microservice 110 may make remote calls to the second microservice 120, the third microservice 130, and the fourth microservice 140. And the fourth microservice 140 may make remote calls to the fifth microservice 150 and the sixth microservice. The microservices and remote calls shown in FIG. 1 are merely an example of one microservice architecture. The number of microservices and the remote calls may be different according to the requirements and design of the particular software application.

As mentioned above, implementing the microservice architecture in designing a software application may enable smaller teams of specialized software developers to focus on a specific set of related services, thereby improving software quality. In addition, software updates may be more easily tested since each microservices may be more independent compared to a monolithic application, even where the microservice is dependent on other microservices. Furthermore, updates to a particular microservice may be deployed without building and deploying the entire application.

While the microservice architecture provides these advantages, there may be a lot of service-to-service communication, which may make the dependency among microservices very complex for software developers to determine. And in applications with a large number of microservices, it may not be easy for software developers to be able to search through the microservices and retrieve information about them. Accordingly, it may be difficult to determine which other microservices need to be changed or tested when changes to a particular microservice are made. There is a need for improved systems and methods for determining dependencies among microservices.

The present disclosure addresses the issues above, and others, by providing systems and methods for generating microservices graphs that may be queried in order to determine dependency information. The microservices graph may be stored in a graph database. A graph database is a database that uses graph structures for semantic queries with nodes (which may also be referred to as "vertices"), edges (e.g., directed edges), and properties to represent and store data. The graph database may relate the data items in the store to a collection of nodes and edges, where the edges representing the relationships between the nodes. The relationships may allow data in the store to be linked together directly. In some cases, the data in the graph database may be retrieved with a single operation. Querying for relationships in a graph database may be fast (e.g., compared to non-graph database) because the relationships are perpetually stored in the database structure.

The graph database may be used to store the microservices information, including the microservice applications and all the services provided. Features and advantages of this technique is that the microservice information may be easily queried or searched in order to find out information that may be useful for developers of the microservices application. For example, a software developer may query the graph database to determine which other microservices depend on a particular microservice, which microservices are used by a particular microservice, and which methods belong to a particular microservice, for example. The graph database may also enable queries to determine methods that are similar to other methods, microservices that are similar to other microservices.

In order to store the microservice information in the graph database, a computer system must obtain the source code for the software application including the source code for each of the microservices of the software application. Then the system may parse the microservices application's code and extract application data, method data, and application programming interface (API) end point data. The parsed information may then be stored into a graph database as node properties and edge relationships. This enables the graph database to be queried in order to select the microservice data as needed. The graph database of the microservice information further enables advanced analytics, including recommendations, search functionality, community detection, and node classification, as further discussed below.

In some embodiments of the graph database, the graph represented by the graph database is a set of vertices (also called "nodes") and a set of edges. Each edge connects two vertices. One vertex may be denoted as the source and the other as the target. Edges may be directed. Any number of edges may connect the same two vertices. Vertices and edges can have an arbitrary number of attributes. An attribute consists of a name that is associated with a data type and a value.

In some embodiments, the primary storage of a graph may be two relational objects that can be tables or views. These objects may be called the vertex table and edge table. The vertex table stores the set of vertices and the edge table stores the set of edges. Vertex attributes correspond to columns of the vertex table. Similarly, edge attributes correspond to columns of the edge table. The maximum number of attributes may be bound by the maximum number of columns for the underlying tables. One vertex attribute or a set of vertex attributes (called the vertex key) may uniquely identify vertices. One edge attribute or a set of edge attributes (called the edge key) may uniquely identify edges. The edge table may contain at least two additional columns that reference the key column of the vertex table. One of the columns identifies the source vertex and the other identifies the target vertex of an edge. If the vertex key consists of multiple attributes, then the edge table's source and target must consist of a corresponding set of attributes.

In other embodiments, a different structure for the graph database may be used.

Figure 2:
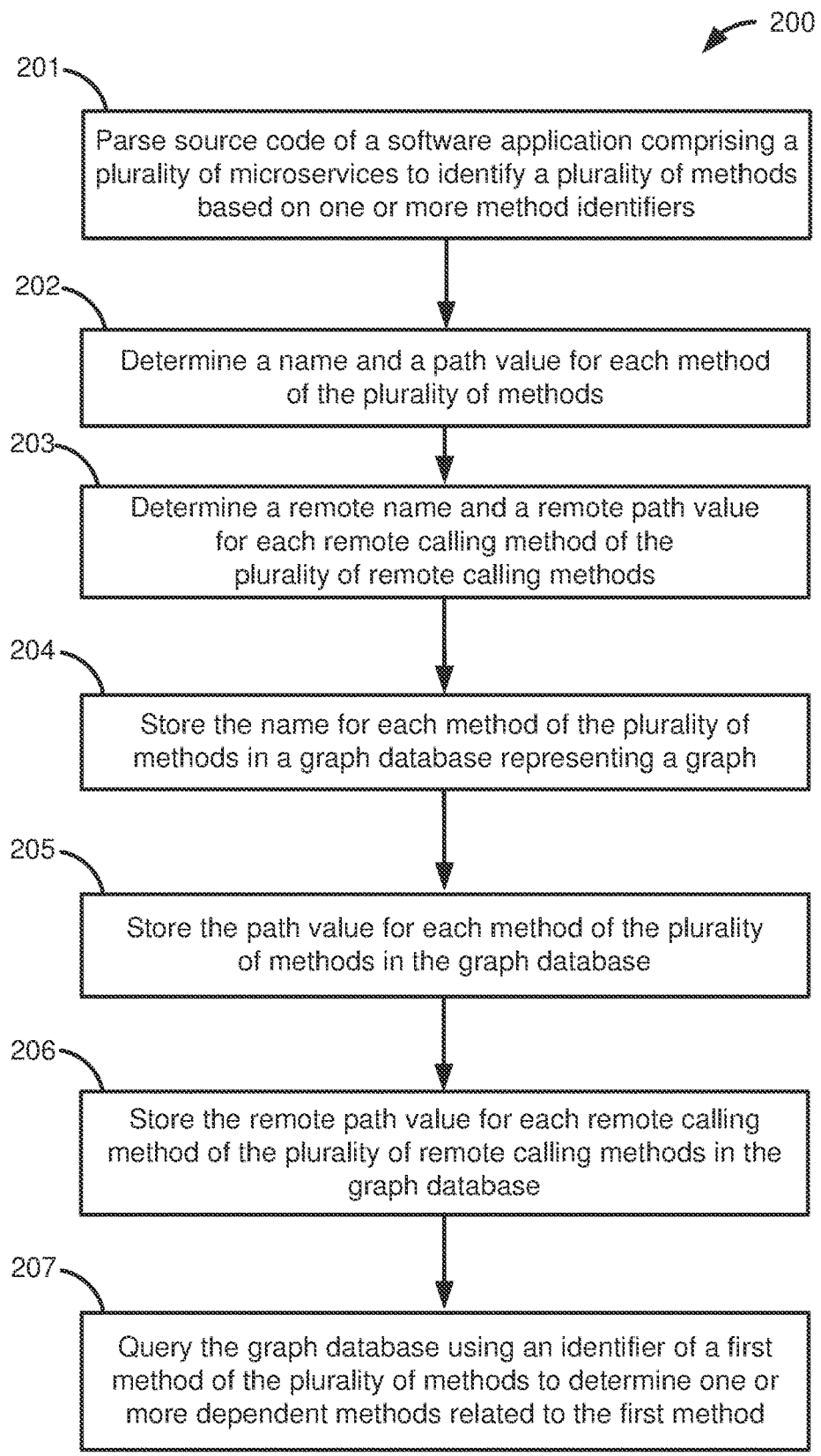
FIG. 2 shows a flowchart of a computer-implemented method for generating a microservices graph, according to an embodiment.

FIG. 2 shows a flowchart of a computer-implemented method for generating a microservices graph, according to an embodiment.

At 201, the computer-implemented method may parse source code of a software application comprising a plurality of microservices to identify a plurality of methods based on one or more method identifiers. The plurality of methods may comprise a plurality of remote calling methods.

At 202, the computer-implemented method may determine a name and a path value for each method of the plurality of methods. The name may identify the method. The path value may identify a microservice that the method belongs to.

At 203, the computer-implemented method may include determining a remote name and a remote path value for each remote calling method of the plurality of remote calling methods. The remote name may identify a remote method of the plurality of methods called by the remote calling method. The remote path value may identify an endpoint for calling the remote method.

At 204, the computer-implemented method may store the name for each method of the plurality of methods in a graph database representing a graph. Each method of the plurality of methods may be represented as a node in the graph.

At 205, the computer-implemented method may store the path value for each method of the plurality of methods in the graph database. Each path value may be represented as an edge between a node representing the method and a node representing the microservice that the method belongs to.

At 206, the computer-implemented method may store the remote path value for each remote calling method of the plurality of remote calling methods in the graph database. Each remote path value may be represented as an edge between a node representing the remote calling method and a node representing the remote method of the plurality of methods called by the remote calling method.

At 207, the computer-implemented method may query the graph database using an identifier of a first method of the plurality of methods to determine one or more dependent methods related to the first method.

In some embodiments, the steps of the method may be performed in a different order. For example, step 202 may be performed before step 203. In some embodiments, steps 204, 205, and 206 may be performed in a different order. The order of performing the steps in the method may be rearranged unless one step depends on another step being performed before it.

One specific example of parsing a software application according to the method of FIG. 2 is described below with respect to FIGS. 3-8. The example software application described with respect to FIGS. 3-8 is written in java for the Spring Boot® open source Java-based framework. However, other platforms or programming languages, such as python or golang, may be used instead in other embodiments instead. The example software application described below is configured according to a configuration file. In the example below, the configuration file is formatted according to "YAML Ain't Markup Language" (YAML, .yml). In other embodiments, the configuration file may be formatted differently. The configuration file may set parameters and values for executing the application. For example, the configuration file may indicate the name of the application (i.e., the application name), set certain features as being enabled or disabled, set security levels, identify API endpoints, etc. The software name may be part of a full path needed to locate a particular method. Thus, the configuration file may be used in determining the full paths for locating each of the methods within the software application. Here, a path refers to a sequence of names in the application's hierarchical structure. A path to a method may include one or more of a Package Name, an Application Name, an API Group Name, and an Endpoint of an API method. For example, a path to a first remote call of second requesting mapping method of a third controller (e.g., group of APIs) of a second application may be application2/controller3/method2/call1. In other embodiments, paths may be defined differently. Determining the full paths of each of the methods in the software application enables method dependencies to be determined. For example, a particular method may be dependent on both internal methods (e.g., within the same application or the same API group) and remote methods provided by other applications (e.g., microservice applications). Such dependency information may be stored in a graph database as mentioned above and further described below. Storing the dependency information in a graph database is advantageous because it enables querying and searching of the microservice application structure, which may be helpful for software engineers that are developing and testing the microservice application and its integration with other dependent applications, classes, or methods.

Figure 3:
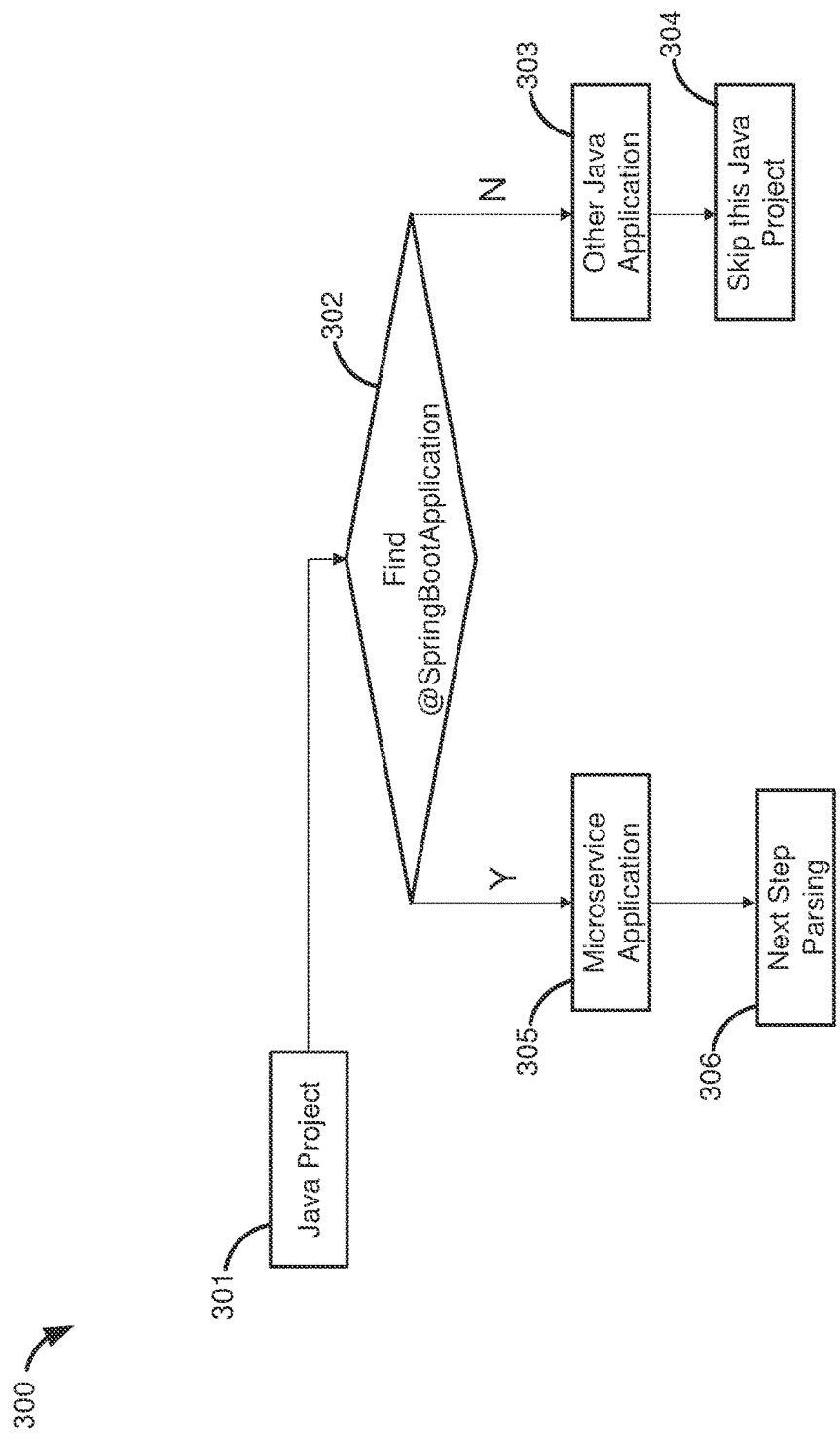
FIG. 3 shows a diagram of parsing a software application, according to an embodiment.

FIG. 3 shows a diagram 300 of parsing a software application, according to an embodiment. In this example, the software application may include one or more Controller classes (identified by an @Controller annotation in the source code), which may include one or more API classes (identified by an @RequestMapping annotation in the source code), which may include one or more methods (also identified by an @RequestMapping annotation in the source code), which may include one or more remote calls (e.g., calls to other APIs). As mentioned above, the software application in this embodiment is written in java for the SpringBoot® open source Java-based framework. The java project for the software application may include one or more applications. Thus, the java project (which may be referred to as an "application" or "program") may include source code and related data for several applications, some of which may be microservice applications. The java project 301 for the software application may be parsed to find one or more microservice application identifiers (e.g., a tag, a flag, or an annotation) in the source code indicating that the application is a microservice application. In this example, the microservice application identifier is "@SpringBootApplication." In other embodiments, a different java annotation may be used as the microservice identifier, or a different string or characters or bits may be used as the microservice identifier. If this application identifier is not found in the source code of an application of the java project 301 at 302 ("N" for no), then the application is another java application 303 (e.g., a non-microservice application). In that case, skip the java project 304. However, if the microservice application identifier is found in the source code at 302 ("Y" for yes), then the process determines at 305 that this code is for a microservice application and proceeds to the next step, parsing, at 306. After the process in FIG. 3, the one or more microservice applications in the java project have been determined. The description of parsing continues in the description of FIG. 4.

Figure 4:
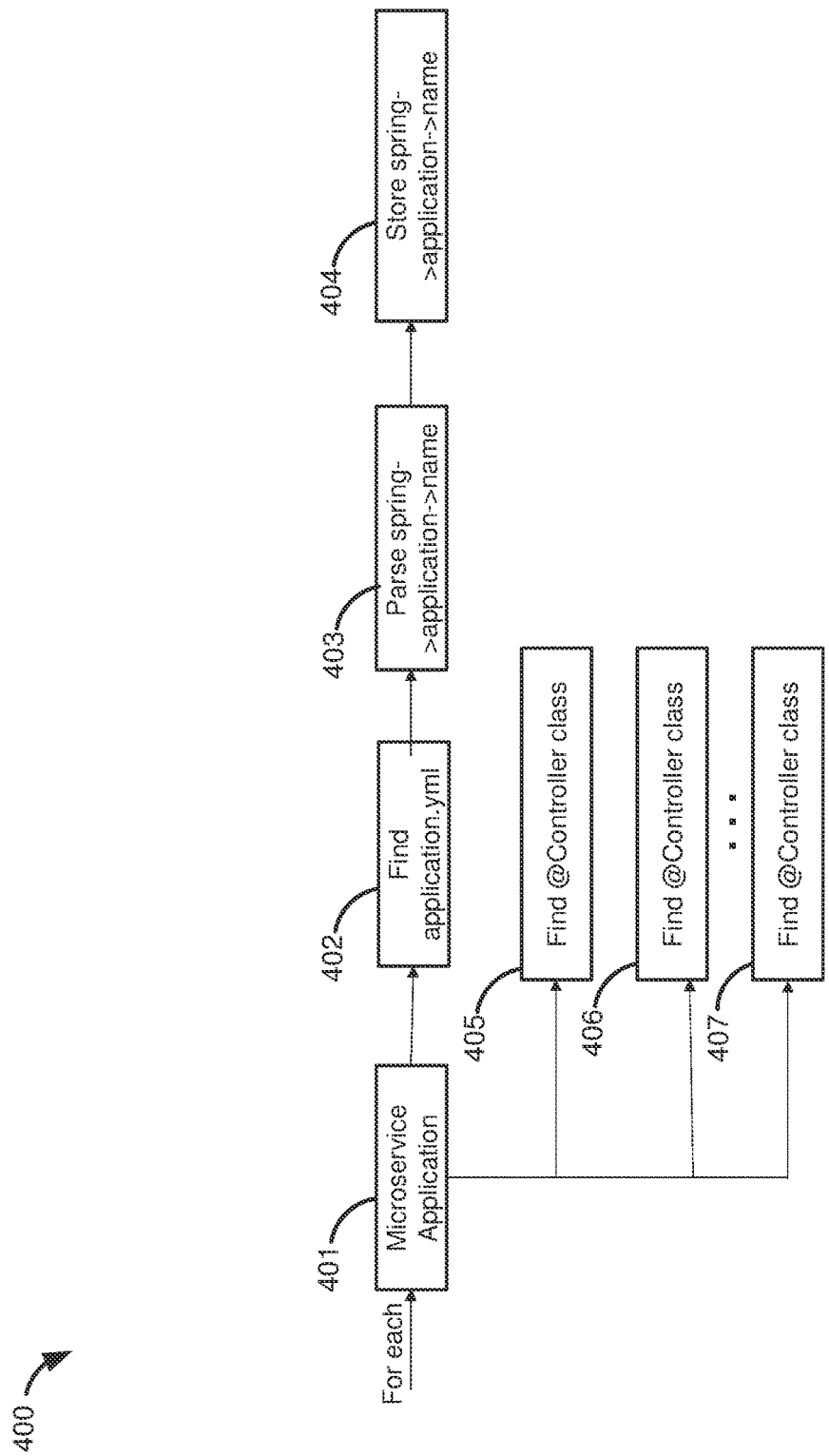
FIG. 4 shows a diagram of parsing a microservice application of a software application, according to an embodiment.

FIG. 4 shows a diagram 400 of parsing a microservice application of a software application, according to an embodiment. As mentioned above, the java project for this example software application may include one or more applications, which may be configured according to a particular configuration file. In this example, the configuration files are .yml files formatted according to YAML. As mentioned above, the configuration file may be parsed to determine the full paths of each method in the application, which indicates dependency information as noted above. In this example, API methods may be grouped according to a controller class. That is, each controller class may have multiple requesting mapping API methods. In other embodiments, API methods may not be grouped according to a controller class, they may be grouped according to some other class or object, or they may not be grouped. In this example, for each microservice application 401 identified in the parsing described above with respect to FIG. 3, the process finds the configuration file 402 (e.g., application.yml), parses the application name 403 from the configuration file (e.g., based on an application name identifier), and stores the application name 404. The application name is part of the full path to the method in this example. As mentioned above, each application may include one or more controllers (e.g., groups of API methods). Then the parsing continues to determine @Controller classes 405, 406, and 407 based on the controller class identifier "@Controller" being in the source code. In this example, three controller classes are shown but ellipsis ( . . . ) are used in FIG. 4 to indicate that there may be more controller classes. In some embodiments there may be less than 3 controller classes. The controller class groups API methods and so the controller is part of the full path to these method in this example. After the process of FIG. 4, the application names of the one or more microservice applications (identified in the process described above with respect to FIG. 3) have been determined and stored, and one or more controller classes of the microservice applications have been identified. The description of parsing continues in the description of FIG. 5.

Figure 5:
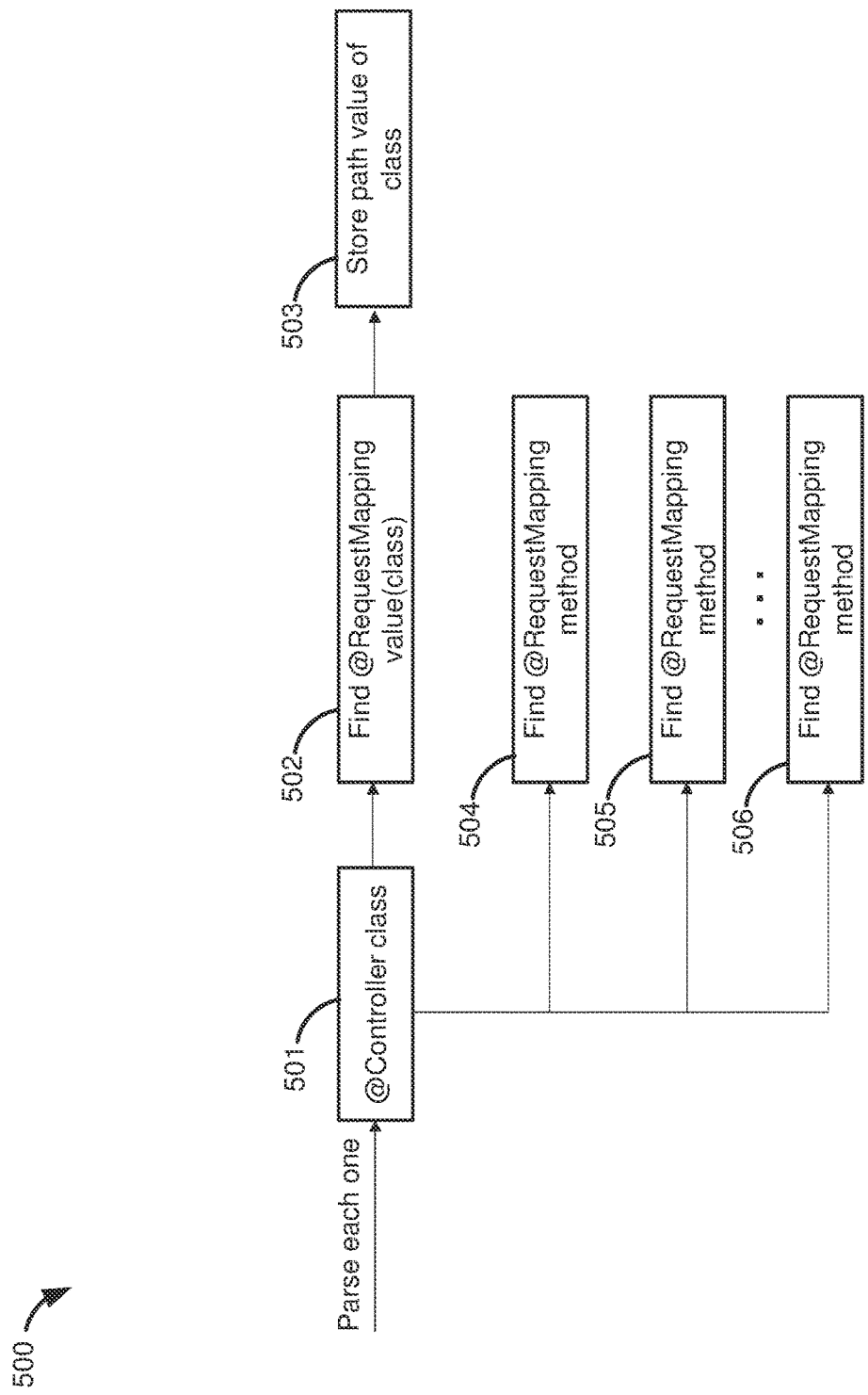
FIG. 5 shows a diagram of parsing a controller class of a microservice application, according to an embodiment.

FIG. 5 shows a diagram 500 of parsing a controller class of a microservice application, according to an embodiment. As mentioned above, a controller may be a group of APIs. Accordingly, each controller class may have one or more API (e.g., it is a group of API). In this example, the "@RequestMapping" class value identifies a particular API (i.e., a java class implementing the functions of that API). The "@RequestMapping" java annotation has this name because it maps a web request to a particular API class. The @RequestMapping annotation may also be used for methods, in addition to classes. In the java language, a class is an object, typically comprising one or more methods and values. For each controller class 501 parsed (in the process described above with respect to FIG. 4), the process in diagram 500 determines the @RequestMapping class value (e.g., class) 502, and then stores the path of the class 503 (e.g., the path from the application, to the controller, to the class of the API). Each of these classes (e.g., the classes identified by the @RequestMapping annotation) include one or more methods (identified by the @RequestMapping annotation in the source code). These one of more methods are used to implement a particular API. Then the process parses to find the "@RequestMapping" method tags 504, 505, and 506 in the source code. In this example, three API RequestMapping methods are shown in FIG. 5, but ellipsis ( . . . ) are used in FIG. 5 to indicate that there may be more controller classes. In some embodiments there may be fewer than 3 API RequestMapping methods. After the process in FIG. 5, the class name and path value of the class have been determined and stored, and the methods of the class have been identified. The description of parsing continues in the description of FIG. 6.

Figure 6:
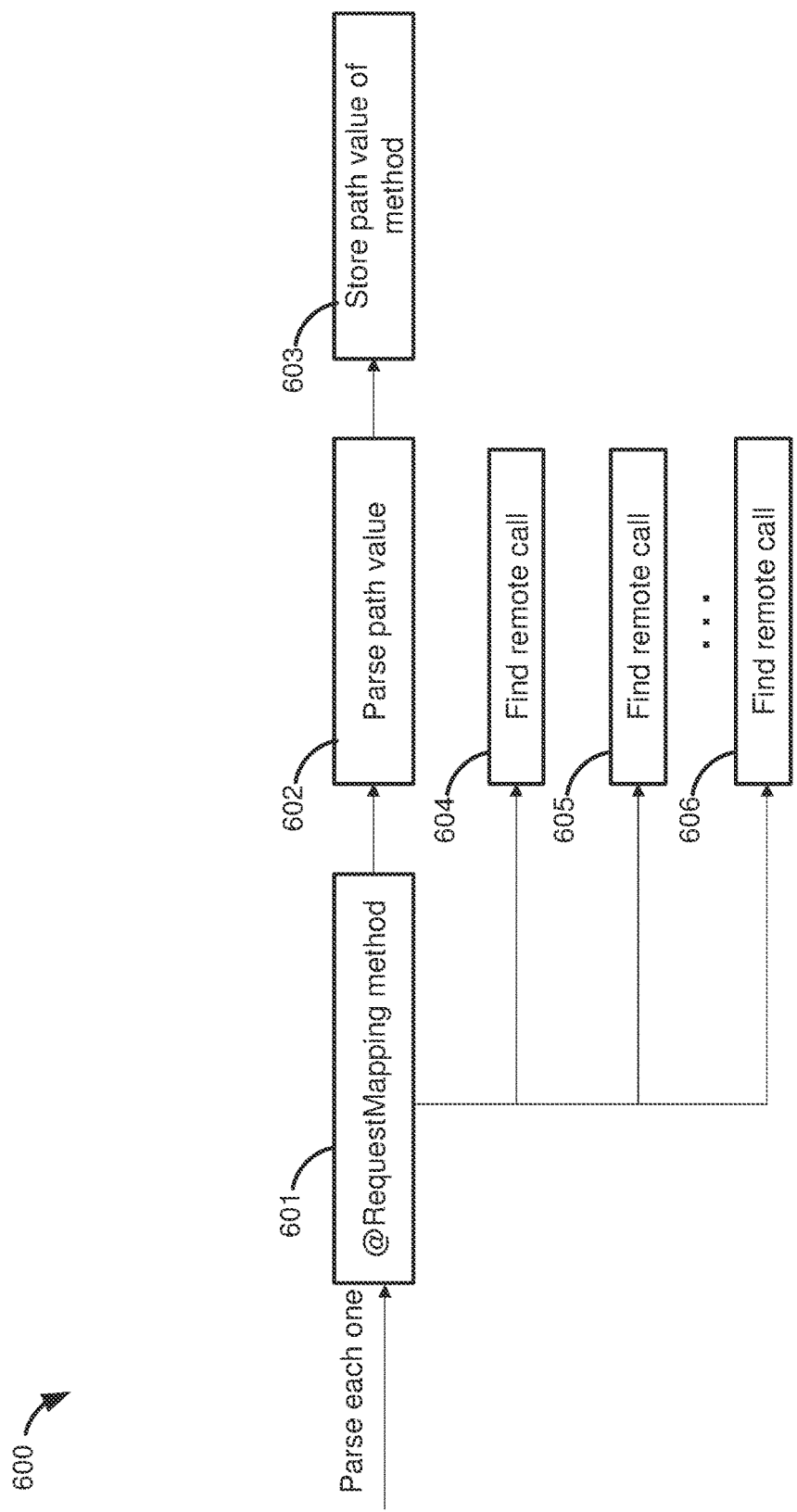
FIG. 6 shows a diagram of parsing a request mapping method of a microservice application, according to an embodiment.

FIG. 6 shows a diagram 600 of parsing a request mapping method of a microservice application, according to an embodiment. As mentioned above, each API class may include one or more methods for implementing the functions of the API. In this example using java, each of these methods may be identified by a name, a return type, and a pair of parentheses. For each request mapping method 601 parsed above (e.g., at 504, 505, and 506), the process parses the path value 602 and stores the path value of the method 603 (e.g., the path from the application, to the controller class, to the API/RequestMapping class, to this particular method). The path value of the method stored at 603 may be based on the corresponding application name (stored at 404) and the path value of the corresponding controller class (stored at 503). And then the process continues to parse the source code to find the remote calls 604, 605, and 606. In this example, three remote calls are shown in FIG. 6, but ellipsis ( . . . ) are used in FIG. 6 to indicate that there may be more remote calls. In some embodiments, there may be fewer than 3 remote calls. The remote calls may be identified based on a particular method or value in the source code (e.g., an address of a microservice, a web request function, or a web address, etc.). The description of parsing continues in the description of FIG. 7.

Figure 7:
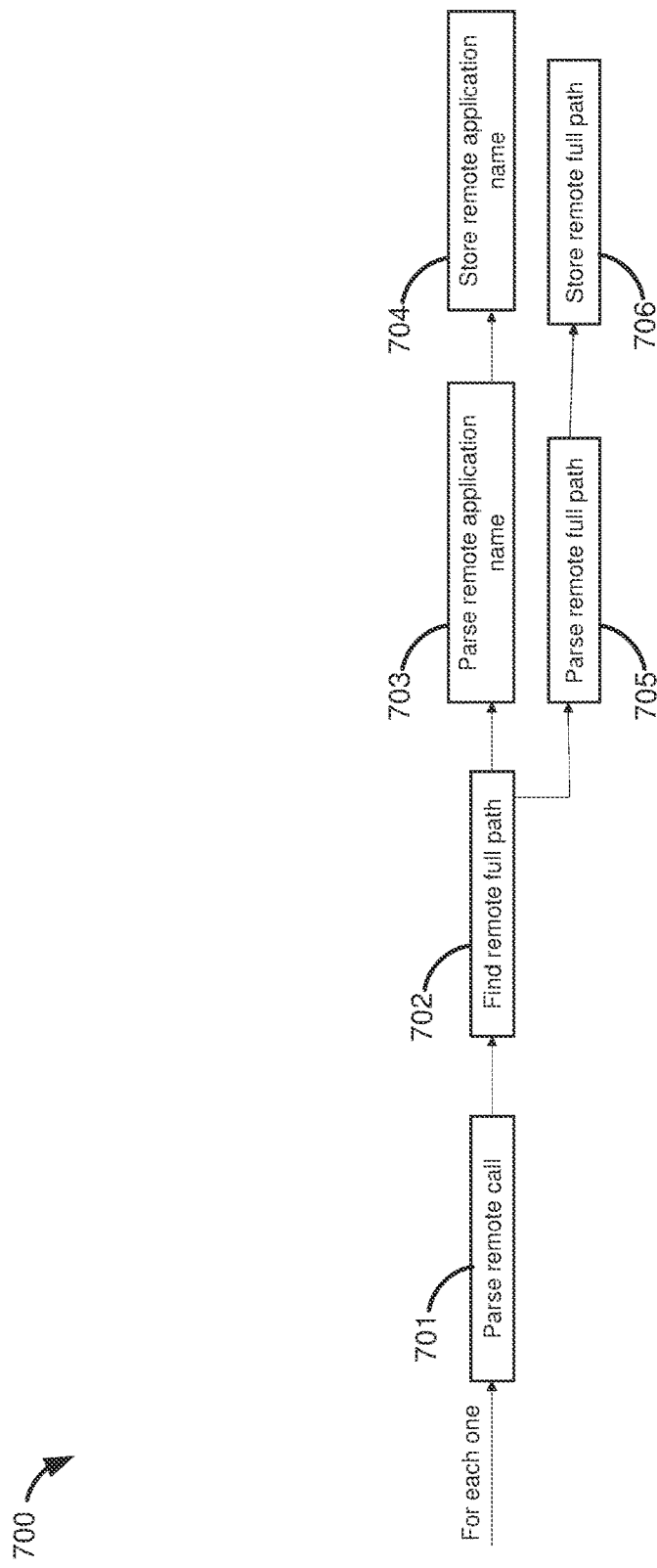
FIG. 7 shows a diagram of parsing a remote call of a request mapping method, according to an embodiment.

FIG. 7 shows a diagram 700 of parsing a remote call of a request mapping method, according to an embodiment. The remote calls may be calls to methods of a remote application. For each remote call 701, the process finds the remote full path 702 (e.g., the path to the remote call of the remote application). The process parses the remote application name 703 and stores the remote application name 704. The remote application name may be determined by parsing a configuration file of the remote application, similar to the process described above with respect to FIG. 4. The process also parses the remote full path 705 and stores the remote full path 706. The full path of the remote call may be determined by parsing the remote application, similar to the process described above with respect to FIGS. 4-6. Thus, both the path to the method including the remote call and the path to the remote method being called are stored. This information may be used as dependency information for generating a graph and this information may be stored in a graph database as further described below. For example, since one method makes a remote call to the remote application, the method is said to be dependent on the remote application. This may be represented by a directed edge in the graph pointing from the method to the remote method.

Figure 8:
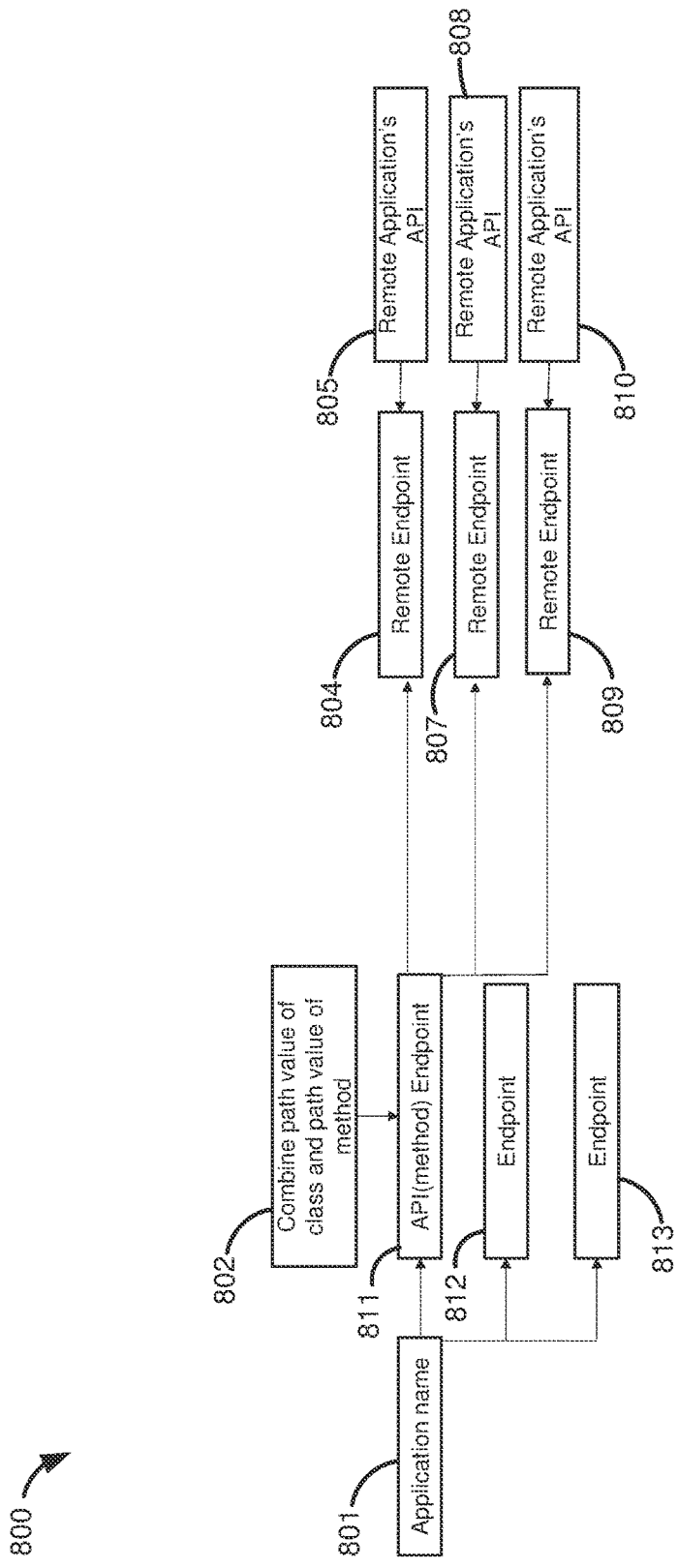
FIG. 8 shows a diagram of method dependency data structure, according to an embodiment.

FIG. 8 shows a diagram 800 of method dependency data structure, according to an embodiment. Methods are said to be "dependent" on a class or application when they belong to that class or application (e.g., they are defined in a particular java class or java application). Methods are also said to be "dependent" on the remote methods that they call. These are called dependencies because the software engineer updating such applications must be aware of dependencies in order to test and verify the integrity of the source code that are working on. For example, when source code for a particular method is modified, that method must still be compatible with any remote methods that are called and with the class and application that the method belongs to. In addition, the method must be compatible with any remote methods that call it. The example in FIG. 8 shows an application that calls remote endpoints (e.g., methods) of three different remote applications. To represent these dependencies as a graph of nodes and edges, a node for the application name 801 has a directed edge to a node for the API endpoint 811. The node for the API endpoint 811 combines the path value of the class and path value of the method 802 (e.g., the endpoint node is the combined path). The node for the application also has a directed edge to the endpoint 812 and endpoint 813. These endpoints represent other methods of the API which belong to the application but which are not further described. The API endpoint 811 has an edge to the endpoints 804, 807, and 809, which belong to the remote application API 805, 808, and 810 respectively. These edges represent remote calls made by the endpoint (method), as discussed above with respect to FIG. 6. In this example, the remote endpoint method 804 belongs to (e.g., is part of) the remote application API class 805 and this is represented by an edge directed from node 805 to node 804. The remote endpoint method 806 belongs to the remote application API class 808 and this is represented by an edge directed from node 808 to node 807. The remote endpoint method 809 belongs to the remote application API class 810 and this is represented by an edge directed from node 810 to node 809. Thus, the directed graph can indicate the dependencies between the methods and classes of the microservices applications. As discussed above, presenting dependency information as a graph may make it easier for software developers to be able to search through the microservices and retrieve information about them. In addition, it may make it easier for software developers to determine which other microservices and methods need to be changed or tested when changes to a particular microservice method are made.

Figure 9:
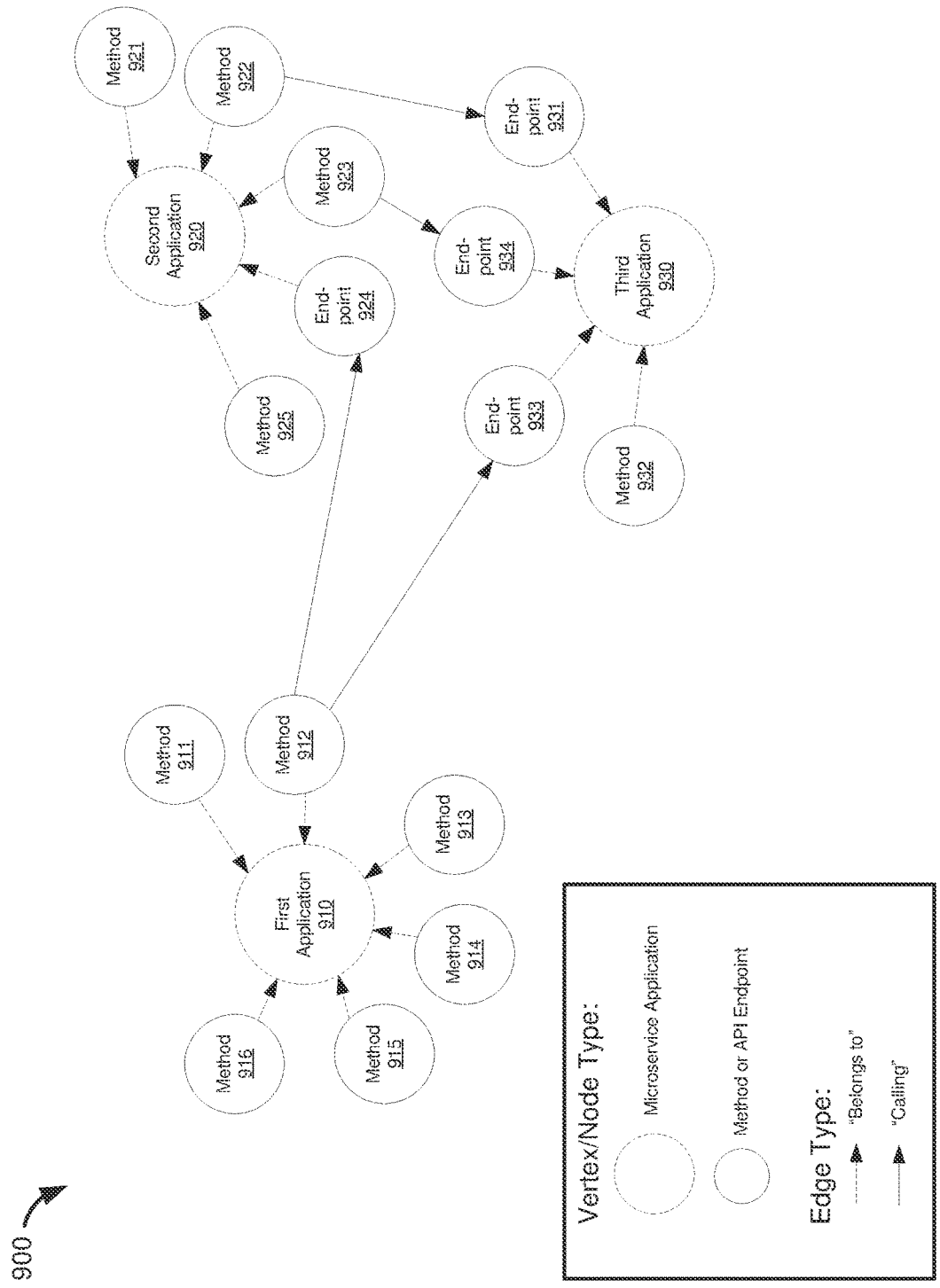
FIG. 9 shows a graph of method dependencies, according to an embodiment.

FIG. 9 shows a graph 900 of method dependencies, according to an embodiment. The graph shown in FIG. 9 is similar to the graph in the diagram of FIG. 8 but at a higher level. This example graph 900 includes a node for a first application 910 including methods 911-916 (i.e., those methods belong to the first application, they are included in the source code of the first application). These dependencies (e.g., "belongs to" dependencies) is indicated by edges directed from these methods to the first application 910. The node 910 may be associated with a name of the application, as determined by the parsing process described above. Nodes 911-916 may be associated with the method name and the path to the corresponding methods, as determined by the parsing process described above. The graph 900 further includes a node for a second application which includes methods 921-923, API endpoint method 924, and method 915 (i.e., those methods and endpoints belong to the second application, they are included in the source code of the second application). These dependencies (e.g., "belongs to" dependencies). The application node 920 may be associated with the application name and the method/endpoint nodes 921-925 may be associated with the corresponding method name and path to the method, as determined by the parsing process described above. The graph 900 further includes a third application 930 including endpoint methods 931, 933, and 934 and method 932 (i.e., those methods and endpoints belong to the third application, they are included in the source code of the third application). The application node 930 may be associated with the application name and the method/endpoint nodes 931-934 may be associated with the corresponding method name and path to the method, as determined by the parsing process described above. In this example, method 912 of the first application 910 includes a remote call to the endpoint method 924 of the second application 920 and a remote call to the endpoint method 933 of the third application 930. These dependencies (e.g., "calling" dependencies) are represented by two directed edges, one edge from node 912 to node 924 and another edge from node 912 to node 933. Method 923 of the second application 920 includes a remote call to the endpoint method 934 of the third application. This dependency is represented by a directed edge from node 923 to node 934. And method 922 of the second application 920 includes a remote call to the endpoint 931 of the third application 930. The graph 900 is just one example of a graph that may be represented by the graph database generated as described above. As described above, the graph is advantageous because it enables the microservice architecture to be queried and dependencies between and within the microservices to easily be determined. Thereby improving development and testing of microservice applications by identification of the dependent methods that need to be verified.

As discussed above, a software application may be parsed to determine dependency information and this dependency information may be represented as a graph and stored in a graph database. Storing such dependency information in a graph database not only enables the data to be queried and searched, it also enables advanced analytics, such as similarity analysis, recommendations, and detection of communities within the graph. These advanced analytic techniques are further described below.

In some embodiments, graph embeddings may be implemented to provide similarity analysis and recommendations. Graph embeddings are the transformation of graph properties to a vector or a set of vectors. The embeddings capture the graph topology, node to node relationships, and other relevant information about the graph, subgraphs, and nodes. Each node (vertex) may be embedded with its own vector representation. The algorithm node2vec may be used to generate a vector representations of nodes on the graph, for example. The node2vec framework learns low-dimensional representations for nodes in a graph through the use of random walks through a graph starting at a target node. The node2vec algorithm follows the intuition that random walks through a graph can be treated like sentences in a corpus. Each node in a graph is treated like an individual word, and a random walk is treated as a sentence.

In some embodiments, search and recommendation may be implemented using vectors. Given two vectors of attributes (e.g., node attributes), A and B, the cosine similarity, $\cos(\theta)$, is represented using a dot product and magnitude as:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

Determining graph embeddings for the nodes of the graph enables the determination of similarity of nodes and recommendations. For example, when searching an API request using the graph, the graph database is able to provide not only the matched items, but also provide the similar items according to similarity. For a recommendation request, the graph database is able to provide recommended items according to similarity. Such information may be useful for software developers since they may be able to determine overlapping classes or methods, which may benefit from being joined in a single microservice. It also enables software developers to discover other useful remote APIs that are not being utilized by a particular method.

In some embodiments, community detection may be provided. A community, with respect to graphs, can be defined as a subset of nodes that are densely connected to each other and loosely connected to the nodes in the other communities in the same graph. Accordingly, applications/endpoints in the same community can be further maintained/developer by the same development team. In addition, when deploying the applications to cloud, the same community can be deployed in the same network for easier access.

Figure 10:
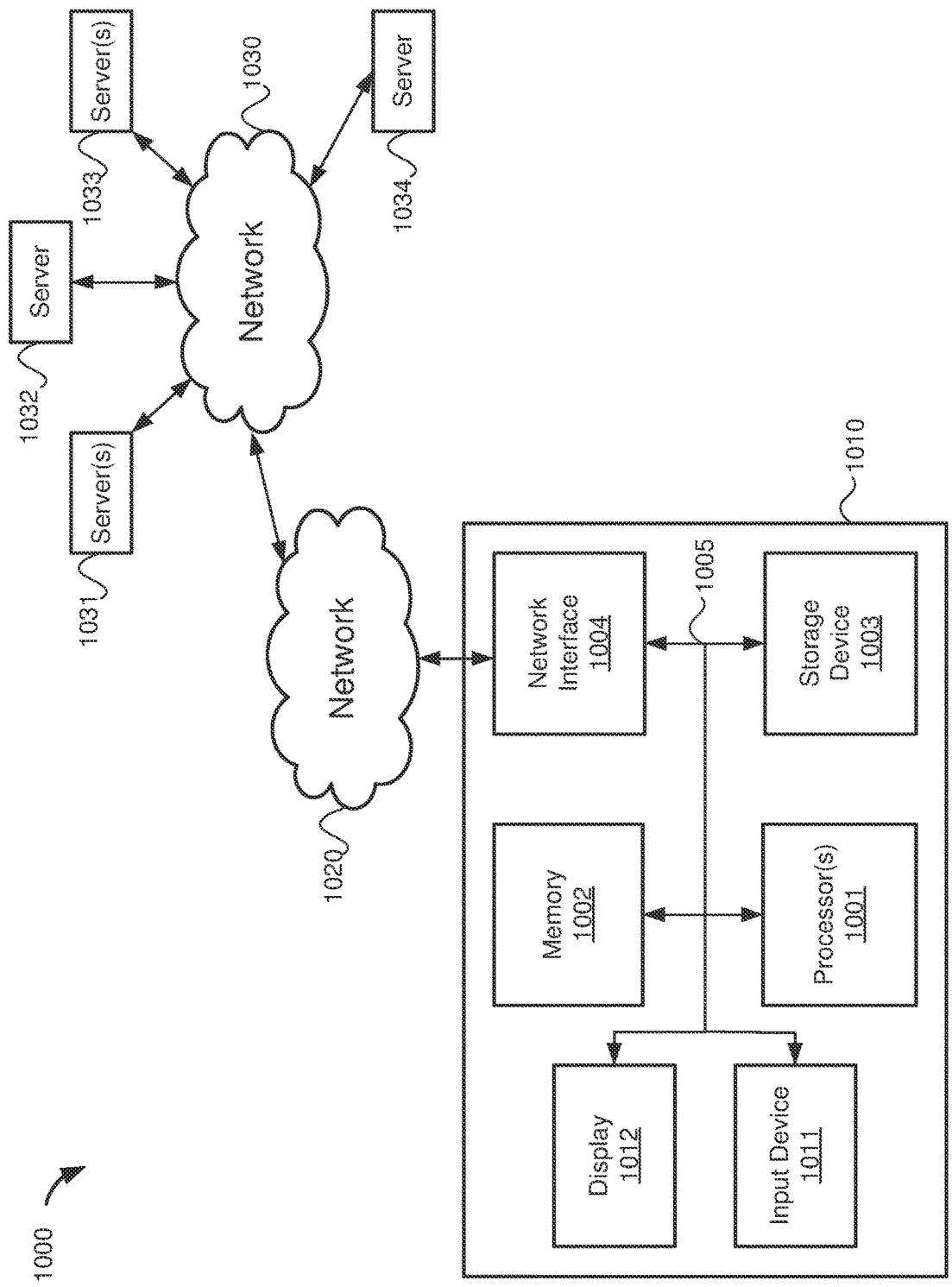
FIG. 10 shows a diagram of hardware of a special purpose computing machine for implementing systems and methods described herein.

FIG. 10 shows a diagram 1000 of hardware of a special purpose computing machine for implementing systems and methods described herein. The following hardware description is merely one example. It is to be understood that a variety of computers topologies may be used to implement the above described techniques.

A computer system 1010 is illustrated in FIG. 10. The computer system 1010 includes a bus 1005 or other communication mechanism for communicating information, and one or more processors 1001 coupled with bus 1005 for processing information. The computer system 1010 also includes a memory 1002 coupled to bus 1005 for storing information and instructions to be executed by processor 1001, including information and instructions for performing some of the techniques described above, for example. This memory may also be used for storing programs executed by processor(s) 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, such as the method described above with respect to FIG. 2, for example. Storage device and memory are both examples of non-transitory computer readable storage mediums.

The computer system 1010 may be coupled via bus 1005 to a display 1012 for displaying information to a computer user. An input device 1011 such as a keyboard, touchscreen, and/or mouse is coupled to bus 1005 for communicating information and command selections from the user to processor 1001. The combination of these components allows the user to communicate with the system. In some systems, bus 1005 represents multiple specialized buses, for example.

The computer system also includes a network interface 1004 coupled with bus 1005. The network interface 1004 may provide two-way data communication between computer system 1010 and a network 1020. The network interface 1004 may be a wireless or wired connection, for example. The computer system 1010 can send and receive information through the network interface 1004 across a local area network, an Intranet, a cellular network, or the Internet, for example. In the Internet example, a browser, for example, may access data and features on backend systems that may reside on multiple different hardware servers 1031-1034 across the network. The servers 1031-1034 may be part of a cloud computing environment, for example.

Additional embodiments of the present disclosure are further described below.

One embodiment provides a computer system comprising one or more processors and one or more machine-readable medium. The one or more machine-readable medium is coupled to the one or more processors. The one or more machine-readable medium store computer program code comprises sets of instructions executable by the one or more processors. The instructions are executable by the one or more processors to parse source code of a software application comprising a plurality of microservices to identify a plurality of methods based on one or more method identifiers. The plurality of methods may comprise a plurality of remote calling method. The instructions are further executable to determine a name and a path value for each method of the plurality of methods. The name identifies the method and the path value identifies a microservice that the method belongs to. The instructions are further executable to determine a remote name and a remote path value for each remote calling method of the plurality of remote calling methods. The remote name identifies a remote method of the plurality of methods called by the remote calling method. The remote path value identifies an endpoint for calling the remote method. The instructions are further executable to store the name for each method of the plurality of methods in a graph database representing a graph. Each method of the plurality of methods being represented as a node in the graph. The instructions are further executable to store the path value for each method of the plurality of methods in the graph database. Each path value is represented as an edge between a node representing the method and a node representing the microservice that the method belongs to. The instructions are further executable to store the remote path value for each remote calling method of the plurality of remote calling methods in the graph database. Each remote path value is represented as an edge between a node representing the remote calling method and a node representing the remote method of the plurality of methods called by the remote calling method. The instructions are further executable to query the graph database using an identifier of a first method of the plurality of methods to determine one or more dependent methods related to the first method.

In some embodiments of the computer system, the instructions are executable by the one or more processors to parse the source code of the software application to identify the plurality of microservices based on one or more microservice identifiers. In such embodiments, the instructions are executable by the one or more processors to store a name for each microservice of the plurality of microservices in the graph database. Each microservice of the plurality of microservice may be represented as a node in the graph.

In some embodiments of the computer system, the graph database stores a unique node identifier, a node type, and a node name for each node of the graph.

In some embodiments of the computer system, the graph database stores a unique edge identifier, a relationship type, an origin node identifier, and a destination node identifier for each edge of the graph.

In some embodiments of the computer system, the instructions are executable by the one or more processors to transform properties of nodes in the graph to sets of vectors, where first properties of a first node of the graph are transformed to a first set of vectors and second properties of a second node of the graph are transformed to a second set of vectors. In such embodiments, the instructions are executable by the one or more processors to determine a cosine similarity between the first set of vectors and the second set of vectors. The cosine similarity indicating a similarity of a first method of the plurality of methods to a second method of the plurality of methods where the first node represents the first method and the second node represents the second method.

In some embodiments of the computer system, the instructions are executable by the one or more processors to obtain a search request including the first set of vectors and return a search response identifying the second node based on the cosine similarity between the first set of vectors and the second set of vectors.

In some embodiments of the computer system, the instructions are executable by the one or more processors to determine communities of nodes in the graph using a community detection algorithm.

Another embodiment provides one or more non-transitory computer-readable medium storing computer program code comprising sets of instructions. The computer program code comprises instructions to parse source code of a software application comprising a plurality of microservices to identify a plurality of methods based on one or more method identifiers. The plurality of methods comprising a plurality of remote calling methods. The computer program code further comprises instructions to determine a name and a path value for each method of the plurality of methods. The name identifying the method. The path value identifying a microservice that the method belongs to. The computer program code further comprises instructions to determine a remote name and a remote path value for each remote calling method of the plurality of remote calling methods. The remote name identifies a remote method of the plurality of methods called by the remote calling method. The remote path value identifies an endpoint for calling the remote method. The computer program code further comprises instructions to store the name for each method of the plurality of methods in a graph database representing a graph. Each method of the plurality of methods being represented as a node in the graph. The computer program code further comprises instructions to store the path value for each method of the plurality of methods in the graph database. Each path value being represented as an edge between a node representing the method and a node representing the microservice that the method belongs to. The computer program code further comprises instructions to store the remote path value for each remote calling method of the plurality of remote calling methods in the graph database. Each remote path value represented as an edge between a node representing the remote calling method and a node representing the remote method of the plurality of methods called by the remote calling method. The computer program code further comprises instructions to query the graph database using an identifier of a first method of the plurality of methods to determine one or more dependent methods related to the first method.

In some embodiments of the one or more non-transitory computer-readable medium, the computer program code further comprises instructions to parse the source code of the software application to identify the plurality of microservices based on one or more microservice identifiers. In such embodiments, the computer program code further comprises instructions to store a name for each microservice of the plurality of microservices in the graph database. Each microservice of the plurality of microservice being represented as a node in the graph.

In some embodiments of the one or more non-transitory computer-readable medium, the graph database stores a unique node identifier, a node type, and a node name for each node of the graph.

In some embodiments of the one or more non-transitory computer-readable medium, the graph database stores a unique edge identifier, a relationship type, an origin node identifier, and a destination node identifier for each edge of the graph.

In some embodiments of the one or more non-transitory computer-readable medium, the computer program code further comprises instructions to transform properties of nodes in the graph to sets of vectors, where first properties of a first node of the graph are transformed to a first set of vectors and second properties of a second node of the graph are transformed to a second set of vectors. In such embodiments, the computer program code further comprises instructions to determine a cosine similarity between the first set of vectors and the second set of vectors. The cosine similarity indicates a similarity of a first method of the plurality of methods to a second method of the plurality of methods, where the first node represents the first method and the second node represents the second method.

In some embodiments of the one or more non-transitory computer-readable medium, the computer program code further comprises instructions to obtain a search request including the first set of vectors and return a search response identifying the second node based on the cosine similarity between the first set of vectors and the second set of vectors.

In some embodiments of the one or more non-transitory computer-readable medium, the computer program code further comprises instructions to determine communities of nodes in the graph using a community detection algorithm.

Another embodiment provides a computer-implemented method. The computer-implemented method includes parsing source code of a software application comprising a plurality of microservices to identify a plurality of methods based on one or more method identifiers. The plurality of methods comprising a plurality of remote calling methods. The computer-implemented method further including determining a name and a path value for each method of the plurality of methods, the name identifying the method. The path value identifying a microservice that the method belongs to. The computer-implemented method further including determining a remote name and a remote path value for each remote calling method of the plurality of remote calling methods. The remote name identifying a remote method of the plurality of methods called by the remote calling method. The remote path value identifying an endpoint for calling the remote method. The computer-implemented method further including storing the name for each method of the plurality of methods in a graph database representing a graph. Each method of the plurality of methods represented as a node in the graph. The computer-implemented method further including storing the path value for each method of the plurality of methods in the graph database. Each path value represented as an edge between a node representing the method and a node representing the microservice that the method belongs to. The computer-implemented method further including storing the remote path value for each remote calling method of the plurality of remote calling methods in the graph database. Each remote path value represented as an edge between a node representing the remote calling method and a node representing the remote method of the plurality of methods called by the remote calling method. The computer-implemented method further including querying the graph database using an identifier of a first method of the plurality of methods to determine one or more dependent methods related to the first method.

In some embodiments of the computer-implemented method, the computer-implemented method further includes parsing the source code of the software application to identify the plurality of microservices based on one or more microservice identifiers. In such embodiments, the computer-implemented method further includes storing a name for each microservice of the plurality of microservices in the graph database. Each microservice of the plurality of microservice represented as a node in the graph.

In some embodiments of the computer-implemented method, the graph database stores a unique node identifier, a node type, and a node name for each node of the graph.

In some embodiments of the computer-implemented method, the graph database stores a unique edge identifier, a relationship type, an origin node identifier, and a destination node identifier for each edge of the graph.

In some embodiments of the computer-implemented method, the computer-implemented method further includes transforming properties of nodes in the graph to sets of vectors, where first properties of a first node of the graph are transformed to a first set of vectors and second properties of a second node of the graph transformed to a second set of vectors. In such embodiments, the computer-implemented method further includes determining a cosine similarity between the first set of vectors and the second set of vectors. The cosine similarity indicating a similarity of a first method of the plurality of methods to a second method of the plurality of methods, where the first node represents the first method and the second node represents the second method.

In some embodiments of the computer-implemented method, the computer-implemented method further includes obtaining a search request including the first set of vectors and returning a search response identifying the second node based on the cosine similarity between the first set of vectors and the second set of vectors.

In some embodiments of the computer-implemented method, the computer-implemented method further includes determining communities of nodes in the graph using a community detection algorithm.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets of instructions executable by the one or more processors to:
parse source code of a software application comprising a plurality of microservices to identify a plurality of methods based on one or more method identifiers, the plurality of methods comprising a plurality of remote calling methods;

determine a name and a path value for each method of the plurality of methods, the name identifying the method, the path value identifying a microservice that the method belongs to;

determine a remote name and a remote path value for each remote calling method of the plurality of remote calling methods, the remote name identifying a remote method of the plurality of methods called by the remote calling method, the remote path value identifying an endpoint for calling the remote method;

store the name for each method of the plurality of methods in a graph database representing a graph, each method of the plurality of methods represented as a node in the graph;

store the path value for each method of the plurality of methods in the graph database, each path value represented as an edge between a node representing the method and a node representing the microservice that the method belongs to;

store the remote path value for each remote calling method of the plurality of remote calling methods in the graph database, each remote path value represented as an edge between a node representing the remote calling method and a node representing the remote method of the plurality of methods called by the remote calling method; and query the graph database using an identifier of a first method of the plurality of methods to determine one or more dependent methods related to the first method.

2. The computer system of claim 1, wherein the computer program code further comprises sets of instructions executable by the one or more processors to:

parse the source code of the software application to identify the plurality of microservices based on one or more microservice identifiers;

store a name for each microservice of the plurality of microservices in the graph database, each microservice of the plurality of microservice represented as a node in the graph.

3. The computer system of claim 1, wherein the graph database stores a unique node identifier, a node type, and a node name for each node of the graph.

4. The computer system of claim 1, wherein the graph database stores a unique edge identifier, a relationship type, an origin node identifier, and a destination node identifier for each edge of the graph.

5. The computer system of claim 1, wherein the computer program code further comprises sets of instructions executable by the one or more processors to:

transform properties of nodes in the graph to sets of vectors, first properties of a first node of the graph transformed to a first set of vectors, second properties of a second node of the graph transformed to a second set of vectors; and determine a cosine similarity between the first set of vectors and the second set of vectors, the cosine similarity indicating a similarity of a first method of the plurality of methods to a second method of the plurality of methods, the first node representing the first method, the second node representing the second method.

6. The computer system of claim 5, wherein the computer program code further comprises sets of instructions executable by the one or more processors to:

obtain a search request including the first set of vectors; and return a search response identifying the second node based on the cosine similarity between the first set of vectors and the second set of vectors.

7. The computer system of claim 1, wherein the computer program code further comprises sets of instructions executable by the one or more processors to:

determine communities of nodes in the graph using a community detection algorithm.

8. One or more non-transitory computer-readable medium storing computer program code comprising sets of instructions to:

parse source code of a software application comprising a plurality of microservices to identify a plurality of methods based on one or more method identifiers, the plurality of methods comprising a plurality of remote calling methods;

determine a name and a path value for each method of the plurality of methods, the name identifying the method, the path value identifying a microservice that the method belongs to;

determine a remote name and a remote path value for each remote calling method of the plurality of remote calling methods, the remote name identifying a remote method of the plurality of methods called by the remote calling method, the remote path value identifying an endpoint for calling the remote method;

store the name for each method of the plurality of methods in a graph database representing a graph, each method of the plurality of methods represented as a node in the graph;

store the path value for each method of the plurality of methods in the graph database, each path value represented as an edge between a node representing the method and a node representing the microservice that the method belongs to;

store the remote path value for each remote calling method of the plurality of remote calling methods in the graph database, each remote path value represented as an edge between a node representing the remote calling method and a node representing the remote method of the plurality of methods called by the remote calling method; and query the graph database using an identifier of a first method of the plurality of methods to determine one or more dependent methods related to the first method.

9. The non-transitory computer-readable medium of claim 8, wherein the computer program code further comprises sets of instructions executable by the one or more processors to:

parse the source code of the software application to identify the plurality of microservices based on one or more microservice identifiers;

store a name for each microservice of the plurality of microservices in the graph database, each microservice of the plurality of microservice represented as a node in the graph.

10. The non-transitory computer-readable medium of claim 8, wherein the graph database stores a unique node identifier, a node type, and a node name for each node of the graph.

11. The non-transitory computer-readable medium of claim 8, wherein the graph database stores a unique edge identifier, a relationship type, an origin node identifier, and a destination node identifier for each edge of the graph.

12. The non-transitory computer-readable medium of claim 8, wherein the computer program code further comprises sets of instructions executable by the one or more processors to:

transform properties of nodes in the graph to sets of vectors, first properties of a first node of the graph transformed to a first set of vectors, second properties of a second node of the graph transformed to a second set of vectors; and determine a cosine similarity between the first set of vectors and the second set of vectors, the cosine similarity indicating a similarity of a first method of the plurality of methods to a second method of the plurality of methods, the first node representing the first method, the second node representing the second method.

13. The non-transitory computer-readable medium of claim 12, wherein the computer program code further comprises sets of instructions executable by the one or more processors to: obtain a search request including the first set of vectors; and return a search response identifying the second node based on the cosine similarity between the first set of vectors and the second set of vectors.

14. The non-transitory computer-readable medium of claim 8, wherein the computer program code further comprises sets of instructions executable by the one or more processors to:

determine communities of nodes in the graph using a community detection algorithm.

15. A computer-implemented method, comprising:

parsing source code of a software application comprising a plurality of microservices to identify a plurality of methods based on one or more method identifiers, the plurality of methods comprising a plurality of remote calling methods;

determining a name and a path value for each method of the plurality of methods, the name identifying the method, the path value identifying a microservice that the method belongs to;

determining a remote name and a remote path value for each remote calling method of the plurality of remote calling methods, the remote name identifying a remote method of the plurality of methods called by the remote calling method, the remote path value identifying an endpoint for calling the remote method;

storing the name for each method of the plurality of methods in a graph database representing a graph, each method of the plurality of methods represented as a node in the graph;

storing the path value for each method of the plurality of methods in the graph database, each path value represented as an edge between a node representing the method and a node representing the microservice that the method belongs to;

storing the remote path value for each remote calling method of the plurality of remote calling methods in the graph database, each remote path value represented as an edge between a node representing the remote calling method and a node representing the remote method of the plurality of methods called by the remote calling method; and querying the graph database using an identifier of a first method of the plurality of methods to determine one or more dependent methods related to the first method.

16. The computer-implemented method of claim 15, further comprising:

parsing the source code of the software application to identify the plurality of microservices based on one or more microservice identifiers;

storing a name for each microservice of the plurality of microservices in the graph database, each microservice of the plurality of microservice represented as a node in the graph.

17. The computer-implemented method of claim 15, wherein the graph database stores a unique node identifier, a node type, and a node name for each node of the graph.

18. The computer-implemented method of claim 15, wherein the graph database stores a unique edge identifier, a relationship type, an origin node identifier, and a destination node identifier for each edge of the graph.

19. The computer-implemented method of claim 15, further comprising:

transforming properties of nodes in the graph to sets of vectors, first properties of a first node of the graph transformed to a first set of vectors, second properties of a second node of the graph transformed to a second set of vectors; and determining a cosine similarity between the first set of vectors and the second set of vectors, the cosine similarity indicating a similarity of a first method of the plurality of methods to a second method of the plurality of methods, the first node representing the first method, the second node representing the second method.

20. The computer-implemented method of claim 19, further comprising: obtaining a search request including the first set of vectors; and returning a search response identifying the second node based on the cosine similarity between the first set of vectors and the second set of vectors.

\* \* \* \* \*